United States Patent [11] 3,614,630

[72] Inventor Louis H. Rorden
Menlo Park, Calif.
[21] Appl. No. 796,539
[22] Filed Feb. 4, 1969
[45] Patented Oct. 19, 1971
[73] Assignee Develco, Inc.
Mountain View, Calif.

[54] RADIO FREQUENCY STANDARD AND VOLTAGE CONTROLLED OSCILLATOR
11 Claims, 4 Drawing Figs.

[52] U.S. Cl. .......... 325/421, 325/422, 329/50, 331/17, 331/36
[51] Int. Cl. .......... H04b 1/16
[50] Field of Search .......... 325/363, 416, 419, 420, 421, 422, 423; 331/1, 16, 18, 25, 30, 36, 17; 329/50, 122, 123, 124, 125, 126

[56] References Cited
UNITED STATES PATENTS

| | | | |
|---|---|---|---|
| 3,032,650 | 5/1962 | Mathison et al. | 331/36 X |
| 3,069,637 | 12/1962 | Seeley, Jr. | 325/423 X |
| 3,163,823 | 12/1964 | Kellis et al. | 325/419 X |
| 3,331,025 | 7/1967 | Rameau | 325/419 |
| 3,435,344 | 3/1969 | Blair et al. | 325/363 |

*Primary Examiner*—Robert L. Griffin
*Assistant Examiner*—R. S. Bell
*Attorneys*—Harvey G. Lowhurst and Lawhurst & Hamrick

ABSTRACT: A radio signal controlled oscillator is provided as a local frequency standard by synchronizing the oscillator using a phase-lock servosystem comprising a long term integrating device as a voltage variable capacitor in the resonant circuit of the oscillator. The device consists of two columns of mercury separated by a substantial gap of electrolyte in a chamber made of dielectric material. Upon comparison of the oscillator signal with the radio signal, any error signal developed is applied across the electrolyte gap to the mercury column to transfer mercury from one to the other by the process of electrolysis. Conductive material wrapped around the chamber serves as a second plate of a capacitor for each of the columns one of which is used as part of the voltage variable capacitor. Means is provided for detecting the loss of the radio signal to interrupt any further change in the variable capacitor until the radio signal is restored.

INVENTOR
LOUIS H. RORDEN
BY
Harvey J. Lamhurst
ATTORNEY

INVENTOR
LOUIS H. RORDEN
BY Harvey J. [signature]
ATTORNEY

RADIO FREQUENCY STANDARD AND VOLTAGE CONTROLLED OSCILLATOR

Background of the Invention

1. Field of the Invention

This invention relates to a radiofrequency controlled oscillator for producing a standard frequency with constant accuracy and to a voltage controlled oscillator therefor having as a variable capacitor a long term integrating voltage variable element 2. Description of the Prior Art Electronic servosystems which automatically adjust the frequency of a local oscillator have been provided by using a received signal as a reference. The reference signal used may be, for example, from any one of various National Bureau of Standards radio stations WWV, WWVH, WWVL and WWVB which provide standard radio frequencies. For instance, station WWVL is synchronized with the frequency of an atomic standard located 11 miles away at the National Bureau of Standards Laboratories in Boulder, Colorado, using a phase-lock loop in a servosystem to so correct the transmitter input phase as to maintain the transmitted output phase in synchronism with the phase at the controlling atomic oscillator. Daily variations of the frequency of the working atomic standard are of the order of 1 or 2 parts in $10^{11}$.

For most demanding application of a local standard frequency signal, daily accuracy of ±1 part in $10^8$ is adequate. Accordingly, it is feasible to devise a radiofrequency controlled oscillator with constant accuracy to that order with a National Bureau of Standards radiofrequency signal as a standard frequency using a phase-lock servosystem. However, some problems are present in that, for example, WWV and WWVH are silent for 4 minutes every hour and may be periodically off for maintenance. Other stations may have maintenance interruptions and WWVB identifies itself by advancing the carrier signal phase 45° at 10 minutes after each hour and returning to normal phase at 15 minutes after each hour. In addition to these problems, which are subject to being changed or eliminated as the National Bureau of Standards changes its operations and services, there are natural problems such as sudden ionospheric disturbances and daily diurnal phase shifts which cause an effective frequency increase in the morning and an effective frequency decrease in the evening.

In one prior art system employing a phase-lock servosystem and a motor driven capacitor to automatically adjust the frequency of a master oscillator (using a received signal as a reference), a real time clock was provided to disengage the motor drive to the capacitor before the evening diurnal shift and until after the morning diurnal shift. That required devising a complex, noise free motor drive system and an oscillator of very high stability to coast through the night, lest a frequency transient be introduced in the morning. However, frequency transients were apparently still subject to occur during the day due to sudden ionospheric disturbances.

Summary

An improved radio signal controlled oscillator is provided to overcome the problems of the prior art using a voltage variable capacitor in the resonant circuit of the oscillator. The voltage variable capacitor comprises an elongated chamber in a body of dielectric material filled with two columns of metal, one extending from one end of the chamber, and the other extending from the other end, with a substantial gap of electrolyte in between. Electrodes extend through the dielectric material to make ohmic contact with the metal columns so that in response to a control voltage signal, metal from one column is electroplated on the other by the process of electrolysis. Conductive material with a tab coupled thereto surrounds the chamber to form a common second plate of two capacitors with the separate columns of metal. In that manner the capacitance of the two capacitors is varied differentially in proportion to the long term integral of the control voltage signal with respect to the time.

To derive the control voltage signal, the oscillator frequency is compared with the radiofrequency signal received. The error signal is then applied to the terminal in ohmic contact with one metal column of the voltage variable capacitor included in the resonant circuit of the oscillator to correct the oscillator frequency. To effectively eliminate the other capacitor formed by the other metal column, the signal present on the tab coupled thereto is transmitted to the second electrode in ohmic contact with the second column of metal.

Since the long term integrating voltage variable capacitor is purposely slow in response, the operation of the servosystem is improved by also applying the error signal to a voltage variable capacitor having rapid response characteristics. The combined effect of the two variable capacitors is constant accuracy of the oscillator frequency in the presence of sudden ionospheric disturbances, or other phase shifts of the radiofrequency signal which are short in duration and in the presence of diurnal phase shifts. A coherent phase detector is employed for best frequency comparison in a phase-lock loop.

In order that the servosystem be automatically, and electronically, disconnected from the voltage variable capacitors when the radiofrequency signal is lost or becomes so weak as to make synchronization therewith unreliable, a second coherent detector is provided to compare the phase of the oscillator frequency with the radiofrequency 90° out of phase with the radiofrequency signal employed in the phase-lock loop. In that manner, the output of the second coherent detector is normally at a maximum and drops to a lower level only when the radiofrequency signal is lost or becomes weak. The low level condition is detected by a threshold device the output of which is employed to shut off a gate transmitting the error signal from the phase-lock loop to the voltage variable capacitors of the oscillator.

DETAILED DESCRIPTION OF THE INVENTION

Figure 1:
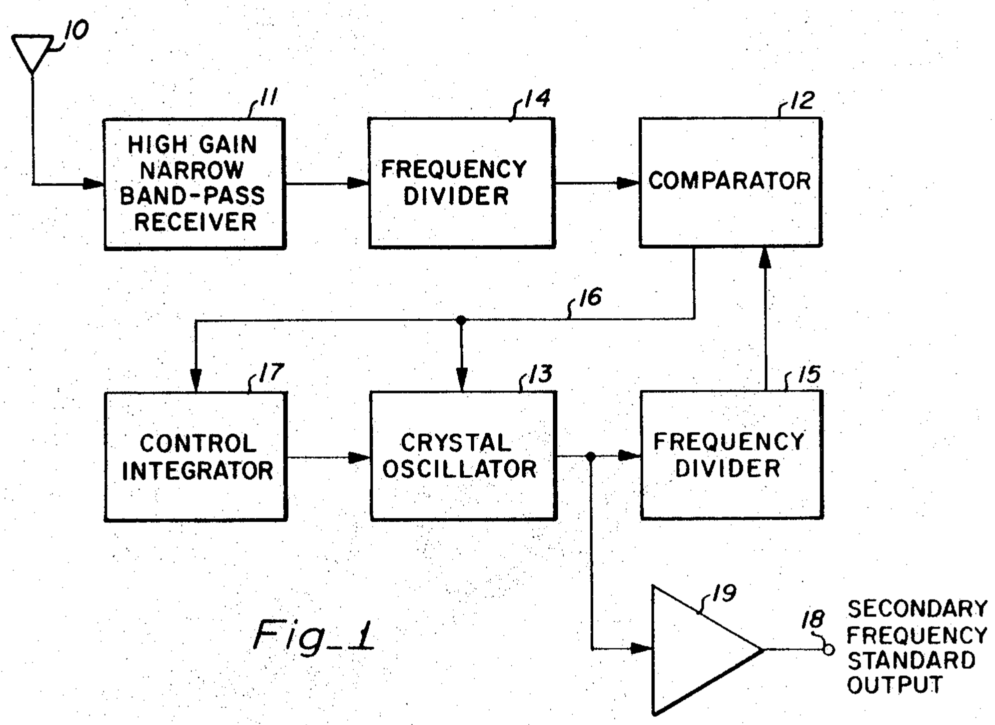
FIG. 1 discloses a simplified radiofrequency standard system in accordance with the present invention.

In the embodiment of FIG. 1, a radio signal is received through an antenna 10 and a high gain, narrow band-pass receiver 11 and applied to a comparator 12 to automatically adjust the frequency of a crystal oscillator 13. To facilitate the comparison, frequency dividers 14 and 15 may be employed. For instance, the radio signal may be a 60 kHz. carrier wave transmitted by the station WWVB and the oscillator 13 may be turned to MHz. The frequency divider 14 reduces the input signal to 2.5 kHz. by a divisor equal to 24. The output of the crystal oscillator 13 is then reduced to 2.5 kHz. by a divisor equal to 400.

Any change in frequency of the oscillator 13 produces a change in the phase relationship between the two 2.5 kHz. input signals to the comparator 12. The comparison is then based on the principle of coherent phase detection. Any phase difference detected in converted to a proportionate DC voltage. When the two signals are in phase, the voltage is zero and when out of phase, the voltage is positive or negative depending upon whether the frequency of the oscillator is greater or less than the frequency standard being received, and the amplitude of the voltage is a function of the phase difference.

To reduce the phase difference to zero, the voltage upon the line 16 is applied to a voltage variable capacitor in the resonant circuit of the oscillator 13 to vary the frequency thereof until the error voltage is zero. Thus, when a frequency error is present, there is a phase difference which is detected and the voltage variable capacitor is automatically adjusted until the phase difference is zero.

In accordance with the present invention, the voltage variable capacitor is a device which is electromechanical in nature, and not purely electrical because purely an electrical device, such as a back biased diode commonly referred to as a varactor, is too rapid in its response and will not hold its setting if for some reason the radio signal is momentarily lost. A long term integrating function is desired in the voltage variable capacitor in order that minor disturbances such as sudden ionospheric disturbances will not cause a change in the oscillator frequency, particularly when such changes are apt to average out, such as daily diurnal phase shifts of all radio signals and hourly phase shifts in the radio signal of WWVB. If continuous and instantaneous change in the voltage variable capacitance is permitted, the oscillator will follow the phase changes of the radio signal as received resulting in a continuously variable frequency output coupled to an output terminal 18 by a buffer amplifier 19.

In the past, a motor-driven capacitor has been used to vary the frequency output of a radio synchronized oscillator, but it was so instantaneously responsive to diurnal phase shifts that the motor drive was disconnected by a real time clock before dusk and not reconnected until after dawn. That required the use of a very stable oscillator which would not drift more then 1 part in $10^9$ in 24 hour period. While the results achieved were acceptable using, for example, WWVL which transmits at 20 kc., the results might not be acceptable in the presence of sudden ionospheric disturbances, or in the presence of periodic phase shifts such as are present in the transmitted signal from WWVB, which as noted hereinbefore, shifts phase back 45° 10 minutes after each hour, and forward 45° 15 minutes after each hour.

Figure 2:
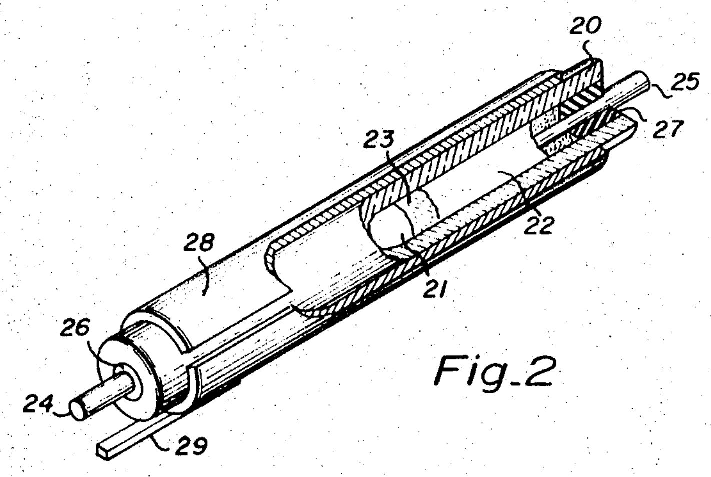
FIG. 2 discloses a voltage variable capacitor.

FIG. 2 illustrates the integrating, voltage variable capacitor provided for the control integrator 17 in the system of FIG. 1. It consists of cylindrical body 20 of dielectric material, such as glass, having an axial bore filled with two columns 21 and 22 of metal such as mercury and an electrolyte in a gap 23 therebetween. Electrodes 24 and 25 in ohmic contact with the columns 21 and 22 extend through end plugs 26 and 27 of suitable material, such as epoxy resin. The electrolyte 23 is so selected as to provide electroplating of the metal columns through the process of electrolysis in response to a voltage applied across the terminals 24 and 25, the direction of electroplating depending upon the polarity of the voltage as more fully described in U.S. Pat. No. 3,045,178 to which reference is made for a more complete teaching of the structure as a reversible coulometer. By wrapping conductive material 28, or otherwise providing a conductive sleeve, around a major portion of the dielectric body 20, the coulometer is converted into an integrating, voltage variable capacitor for as metal is electroplated from the column 21 to the column 22, the effective capacitance between the electrode 24 and a tab 29 connected or otherwise electrically coupled to the conductive material 28 decreases. At the same time, the capacitance between the electrode 25 and tab 29 increases for the reason that as the column 21 gets shorter, the column 22 gets larger and the capacitance in each instance is directly proportional to the surface area of the column within the conductive material. For convenience, the dielectric material 20 may be glass and the conductive material 28, such as conductive epoxy, may be removed along a path parallel with the axis of the columns 21 and 22 in order to be able to view the position of the gap 23.

Figures 3, 4:
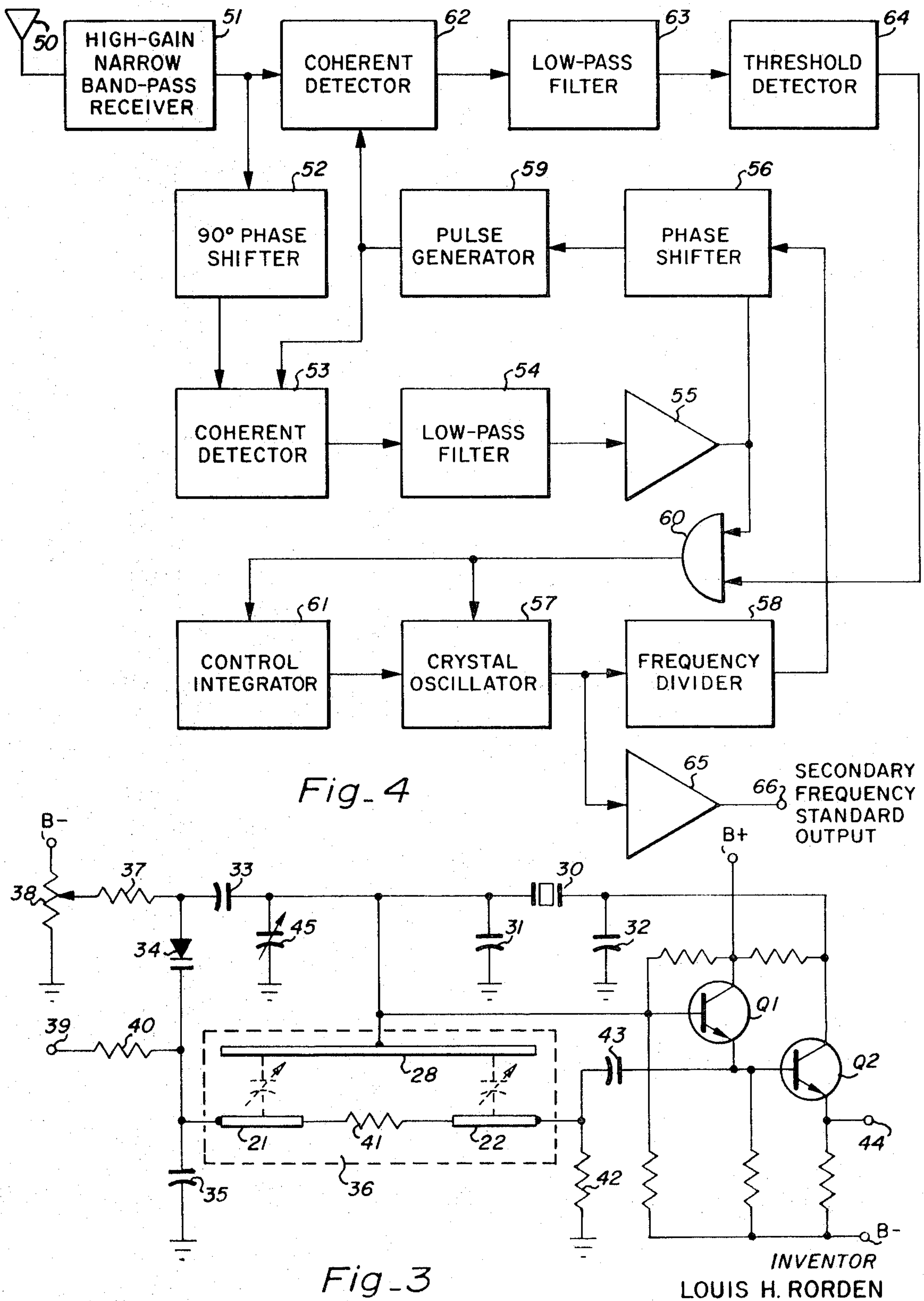
FIG. 3 discloses a voltage controlled oscillator employing the voltage variable capacitor of FIG. 2 for use in the system of FIGS. 1 and 4.
FIG. 4 discloses a preferred embodiment of a radiofrequency standard system using a phase-lock servo and having automatic disconnection of the servo upon loss of the radiofrequency signal.

FIG. 3 illustrates a parallel-resonant crystal oscillator of the type referred to as a Pierce oscillator comprising a piezoelectric crystal 30 so connected to a pair of frequency determining capacitors 31 and 32 as to provide oscillation of the crystal in an antiresonant mode. Transistors $Q_1$ and $Q_2$ connected in respective emitter-follower and voltage amplifying configurations provide regenerative feedback. Capacitors 33, 34 and 35 are in parallel with capacitor 31, and therefore have an effect on the frequency of the oscillator. The device 36 is constructed as described with reference to FIG. 2 and connected as shown also has an effect on the frequency as will be described hereinafter.

The capacitor 34 is voltage variable, and is of the type commonly referred to as varactor. It consists of a PN junction diode, such as a silicon diode, so back biased by a resistor 37 and a potentiometer 38 that conductance through it is only at high-frequencies through its internal capacitance. It is characteristic of such a device that its capacitance varies as a function of the back bias voltage. Accordingly, to vary the capacitance of the varactor 34, a control voltage is applied thereto from an input terminal 39 through a resistor 40. However, any change in capacitance affected thereby to change the frequency of the oscillator will persist only so long as the voltage applied at the input terminal 39 remains unchanged since the capacitance is a function of voltage, and its response to a change in voltage is rapid. In operation, a positive control signal decreases its capacitance and a negative signal increases its capacitance.

The device 36 receives the same control voltage applied at the terminal 39 through resistor 40. The internal resistance of the device, represented schematically as a fixed resistor 41 between metal columns 21 and 22, is in series with a resistor 42 which, through circuit ground, provides a return path for the control signal at input terminal 39. In that manner, a positive control signal at terminal 39 will cause current to flow through the electrolyte of the device and metal from the column 21 to be electroplated on the column 22 to thereby decrease the capacitance between the conductive material 28 and the column 21. The capacitance between the material 28 and the column 22 is simultaneously increased. To effectively eliminate that capacitance from the circuit in order that any change thereof will not affect the frequency of the oscillator, the emitter of transistor $Q_1$ is coupled to the column 22 by a capacitor 43. With the same signal being applied in phase to both the column 22 and the material 28, any increase (or decrease) in response to a negative control signal of the capacitance therebetween is ineffective.

The response of the device 36 to control signal is controlled by the sum of the resistors 40, 41 and 42. It may be selected to have an effective time constant as high as 30 or more hours. By that it is meant that for a given frequency error, the resistors may be selected to require as much as 30 or more hours to correct through variation of the capacitance between the column 21 and the material 28. However, a time constant of about 3 hours will allow for an accurate frequency output during periodic phase shifts as occur in the transmitted signal from station WWVB, and during sudden ionospheric disturbances as well as during diurnal phase shifts. This is so because of the integrating function inherent in the operation of the device 36 which in the present invention is the electronic analog of a mechanical flywheel. In that manner, the device 36 enables the oscillator to maintain a constant accuracy in the presence of temporary phase shifts of the radio frequency standard or in the vent of temporary loss of the radio signal. The signal at the output 44 of the oscillator may then be used as a secondary standard with confidence.

In operation, the oscillator is initially adjusted to the desired frequency, such as 1 mHz. by first adjusting the potentiometer 38 to provide four volts of back bias on the varactor 34 which zero volts at terminal 39. That provides nominal capacitance within a more limited range (50 to 150 picofarads) in response to a control voltage signal at terminal 39. The capacitors 31 and 32, on the other hand, are larger by several orders of magnitude, such as six or seven, depending upon the interelectrode capacitance and other reactive parameters of the crystal selected. In practice, at least one of those capacitors (capacitor 31) is selected only after the crystal 30 has been selected in order to have the oscillator frequency within adjustable range of the desired frequency. A variable capacitor 45 is then relied upon to provide course adjustment. After a short period of time, the control voltage signal at terminal 39 will operate on the integrating, variable capacitance device 36 for fine adjustment of the oscillator to within one part in $10^9$ of the desired frequency. To shorten the initial adjusting time for the device 36, the total resistance of the resistors 40, 41 and 42 may be temporarily decreased, as by switching in a small resistor (not shown) in parallel with the resistor 40.

Once the initial adjustments have been made and the long time constant of the device 36 has been restored, the oscillator will remain stable due to the flywheel effect of the device 36. Minor disturbances of short duration will have little effect on the device 36 because of its long time constant, and although such disturbances will have an immediate effect on the varactor 37 to change its capacitance by as much as approximately ±50 percent, the change will have only a slight effect on the resonant circuit because its maximum change in capacitance is so small as to produce a maximum change in the resonant circuit of at most one part in $10^9$.

Since the crystal 30 is temperature sensitive, an oven should be provided for it. But even then, the crystal, and other circuit components, are apt to change with age. However, such changes are gradual so the integrating device 36 will adjust perfectly for such aging until all of the metal on one column has been transferred to the other. It is for that reason that transparent dielectric material is preferred for the body 20 of the device shown in FIG. 2. A longitudinal slot cut in the conductive material 28 will then enable the operator to see when another "initial adjustment" should be made through the capacitor 45. In practice, that should not be necessary more often than once per year. Should the operator overlook making that simple adjustment, the metal of one of the columns may be completely transferred to the other, but if so it would be a simple matter to replace the inexpensive device 36 and then make the initial adjustments again.

FIG. 4 illustrates a preferred embodiment of the present invention employing to greater advantage the device of FIG. 2. As in the first embodiment, an antenna 50 is connected to a high-gain, narrow band-pass receiver. A 90° phase shifter 52 couples the receiver 51 to a coherent detector 53 the output of which is converted by a low-pass filter 54 having a band width of 0.006 Hz. to a DC signal the amplitude and polarity of which corresponds to the magnitude and sign of the phase difference detected. A buffer amplifier 55 is employed to couple the phase difference signal to a phase shifter 56 which receives a signal from a crystal oscillator 57 through a frequency divider 58. The oscillator is preferably of the same configuration as that described hereinbefore with reference to FIG. 3, and adjusted for operation at 1 mHz. The frequency divider 58 is then preferably designed to reduce the frequency of the signal transmitted to the phase shifter 56 by a factor of 400. The lower frequency (2.5 kHz.) signal is then phase shifted in direct proportion to the phase difference to a maximum of ±180° of 2.5 kHz.

The phase shifter 56 may, for example, be a monostable multivibrator circuit so biased by the output of the amplifier 55 as to trigger at the zero crossover of the 2.5 kHz. signal but to return to its stable state after a lapse of 200 microseconds plus or minus a maximum of 200 microseconds, depending upon the magnitude and sign of the phase difference. This will allow for a phase shift of ±180° for the 2.5 kHz. signal since the period of the 2.5 kHz. signal is 400 microseconds. In practice, however, a more limited range of phase shift will suffice such as ±100 microseconds (±90° for the 2.5 kHz. signal). The output of the phase shifter 56 (trailing edge of the monostable multivibrator) triggers the pulse generator 59 to produce a 2.5 kHz. train of 4 microsecond pulses which are phase locked to the 60 kHz. signal to an accuracy of one part in $10^7$. The pulse generator 59 may also be a monostable multivibrator.

When the 2.5 kHz. signal to the pulse generator 59 is in phase with the 60 kHz. signal from the 90° phase shifter 52, the 4 microsecond pulse strobes the coherent detector 53 during the first quarter cycle and causes the coherent detector 52 to transmit unipolar pulses to the low-pass filter 54. The output of the low-pass filter 54 (transmitted to the phase shifter 56 by buffer amplifier 55 as DC signal) then causes the 2.5 kHz. signal to the pulse generator 59 to shift relative to the 60 kHz. signal at the coherent detector 53 until pulses from the generator 59 strobe the 60 kHz. signal at the zero crossover point of each cycle such that equal bipolar pulses are transmitted to the low-pass filter 54, and the output therefrom is reduced to zero volts. The phase of the 2.5 kHz. signal is thereby locked in with the 60 kHz. signal.

A gate 60 is normally enabled to transmit the output signal of the amplifier 55, which may be referred to as the error signal of the servosystem, to the crystal oscillator 57 and control integrator 61. The combination and operation of the control integrator and crystal oscillator is the same as the control integrator 17 and crystal oscillator 13 of FIG. 1 more fully disclosed and described with reference to FIG. 3. Referring to the latter figure, the error signal is applied at terminal 39 to adjust the frequency of the oscillator (phase of the output signal at terminal 44) until the error signal at terminal 39 is reduced to zero. However, as noted hereinbefore, the long time constant of the deice 36 will not produce a change in the oscillator except over a long period of time from 3 to 30 or more hours, depending upon the total value of the resistors 40, 41 and 42. This is so because the device 36 responds to the error signal only in proportion to the time rate of electrical current which flows through it, causing mercury at the positive column to be electroplated onto the negative column through the electrolyte. Thus, the device 36 integrates the error signal to provide long term correction of frequency output while the high total resistance (typically 10 to 12 K. ohms) of the resistors 40, 41 and 42 limit the instantaneous change in frequency to virtually zero. The instantaneous change in frequency is thereby limited to that which the varactor 34 may produce in response to error signals of typically 0 to ±3 volts. However, due to the ratio of the total change in capacitance in the varactor 34 to the total capacitance in series between the crystal 30 and ground, the instantaneous phase shift of the oscillator will be very small (in the order of one part in $10^9$). The purpose of such small, but rapid response of the varactor is, as noted hereinbefore, to prevent the servosystem from hunting by causing some capacitance to be removed, or added, to the resonant circuit as the error voltage approaches zero in response to addition, or removal, of capacitance through the much slower device 36. In other words, the varactor 34 merely anticipates to a small degree a change in resonant circuit capacitance to be made through the device 36 and then removes any change it makes as the change is realized through the device 36.

Referring again to FIG. 4, a second coherent detector 62 is connected to the receiver 51 and to the pulse generator 59. Since the 60 kHz. signal applied to the second coherent detector is 90° out of phase with that applied to the first (owing to the 90° phase shifter 52 which could just as well have been placed in the channel of the second coherent detector 62), the output of the second filtered by a low-pass filter 63 (band width 0.025 Hz.), is a maximum while the output of the first filtered by the low-pass filter 54 is minimum. Accordingly, the presence of a DC signal from the filter 63 may be employed to determine when there is a 60 kHz. signal being received by the receiver 51.

Because of the phase-lock loop around the first coherent detector 53 and the phase shifter 56, the DC signal from the filter 63 will be of a predetermined polarity as long as a 60 kHz. signal is being received. A simple threshold device may therefore be provided to detect the presence of that signal and in response thereto enable the gate 60 to transmit error signals to the control integrator 61 and crystal oscillator. For that purpose, a bipolar switch is required for the gate 60, such as a Bright switch, or the equivalent thereof in bipolar and Field Effect transistors. If the 60 kHz. signal is momentarily lost or becomes too weak for reliable coherent detection, the signal from the filter 63 drops below the threshold level provided by the detector 64 and the gate 60 is disabled. In that manner the last adjustment provided for the oscillator is retained by the nonvolatile memory feature of the device 36 (FIG. 3) and the frequency being transmitted at the time through a buffer amplifier 65 to an output terminal 66 is retained as the output frequency standard until a sufficiently strong 60 kHz. signal is again received.

As the 60 kHz. signal comes on again after having been lost, the phase-lock loop will establish a proper phase relationship for the pulse generator 59. Until that proper phase relationship is approached to the degree desired by the setting of the threshold level of the detector 64, the gate 60 remains disabled. In that manner, control over the oscillator is resumed without an abrupt change in the error signal transmitted thereto due to the process of locking in.

In summary of the operation of embodiments illustrated in FIGS. 1 and 4, a difference in phase due to the local oscillator drifting from the desired frequency is detected by the comparator 12 in FIG. 1 and the coherent detector in FIG. 4, and as a result thereof, an error signal is transmitted to terminal 39 of FIG. 3. If the oscillator frequency has increased, a negative error signal is transmitted. As a consequence, the capacitance of the varactor 34 is increased immediately in proportion to the amplitude of the error signal, but only in a very small proportion (one part in about $10^9$) to the change necessary to reduce the frequency of the oscillator to a point of zero phase difference with the 60 kHz. radio signal.

In time, current form the terminal 39 to ground will electrochemically transfer metal from the column 22 to the column 21 sufficiently to reduce the frequency of the oscillator by the requisite amount. As that occurs, the error signal will decrease, thereby gradually removing the change in capacitance in the varactor 34. When the error signal has been reduced to zero, the varactor 34 will be at its nominal value of capacitance set by potentiometer 38, and current flow through the device 36 will cease. The oscillator will then remain in stable operation at the new lower frequency This assumes, of course, that the frequency difference has persisted for an extended period of time. Short periods of frequency difference as may result due to diurnal phase shifts, or the hourly phase shift purposely introduced by the station WWVB, will not alter the frequency of the oscillator by more than one part in $10^8$ because the small current through the device 36 will not have time to change the capacitance between the column 21 and the conductive material 28 enough to introduce a greater change in frequency. If the oscillator frequency has decreased, a positive error signal is produced and the varactor 34 and device 36 are so affected oppositely to increase the frequency of the oscillator.

In the embodiment of FIG. 4, the loss of radio signal is detected by the combination of the second coherent detector 62, low-pass filter 63 and threshold detector 64 to disable the gate 60. Under that condition, the oscillator will continue to operate without any change in the varactor 34 and device 36 until a radio signal of a predetermined level is detected. The present state of the art will permit the oscillator to be so produced as to be stable to within one part in $10^8$ for periods of about 12 to 16 hours. Therefore, a continuous and reliable secondary frequency standard can be provided in accordance with the present invention even if the National Bureau of Standards transmitter is shut down periodically for maintenance periods of about 8 hours.

It should of course, be appreciated that if stable operation for periods longer than 12 to 16 hours is achieved through proper selection of circuit components, particularly the crystal, the time constant of the device 36 may be increased by increasing the resistance of the resistors 40 and 42. Similarly, if less control through the varactor 34 is desired, because of increased accuracy desired, for example, the value of the resistor 42 may be decreased. If that is done, however, the time constant of the device is decreased unless the resistor 40 is proportionately increased. However, regardless of the components selected, the combination of the varactor 34 and the device 36 will provide the flexibility necessary to meet operating requirements by, in most instances, simply adjusting the value of resistors 40 and 42. In fact some means may even be provided to change the value of one or both of those resistors in response to predetermined conditions or a present program. As noted hereinbefore, it would be desirable for example, to decrease the time constant of the device 36 during initial operation of the system. It may also be desirable to do so after a predetermined time that the gate 60 in the embodiment of FIG. 4 has been disabled. These and other modifications to meet particular operating requirements are within the skill of the art. Accordingly, the appended claims are to be limited to only the true scope and spirit of the present invention and not to particular embodiments shown by way of example.

I claim:

1. A signal controlled oscillator apparatus comprising:
a radio receiver operative to develop an electrical signal;
an oscillator circuit including an active element and a turned circuit including a nonmechanical electrically variable reactance, said variable reactance being variably responsive to a first control signal and operative to cause said oscillator circuit to develop an oscillatory signal; and
a signal comparator including a phase-locked first coherent detector responsive to said electrical signal and said oscillatory signal and operative to develop said first control signal.

2. A signal controlled oscillator apparatus as defined in claim 1 wherein said signal comparator further includes a phase shifting means responsive to said first control signal and operative to modify said oscillatory signal for application to said first detector.

3. A signal controlled oscillator apparatus as defined in claim 2 wherein said phase shifting means comprises a phase shifter for shifting the phase of said oscillatory signal and a pulse generator triggered by the phase shifted oscillatory signal and operative to generate a train of pulses, said pulses being applied to said first coherent detector for causing it to sample said electrical signal.

4. A signal controlled oscillator apparatus as defined in claim 2 including a second coherent detector, means for coupling said electrical signal to said second coherent detector, 90° out of phase with the electrical signal applied to said first coherent detector, said second coherent detector also being responsive to said pulses and operative to develop a second control signal which is a maximum when said first control signal is a minimum, and a gate responsive to said second control signal and operative to couple said first control signal to said oscillator circuit only when said second control signal is present.

5. A signal controlled oscillator apparatus as defined in claim 4 and further including a threshold detector for coupling said second coherent detector to said gate whereby said second control signal enables said gate to transmit said first control signal only when said second control signal exceeds a predetermined minimum level of amplitude.

6. A signal controlled oscillator apparatus as defined in claim 1 wherein said nonmechanical electrically variable reactance comprises an elongated body of dielectric material forming an elongated chamber, a first column of metal extending from one end of said chamber toward the center thereof and a second column of metal extending from the other end of said chamber toward said center with a substantial gap between said columns, an electrolyte filling said gap, said electrolyte being suitable for electroplating the metal from one column onto the other through said gap in response to an electrical current passing therethrough, a separate electrode in ohmic contact with each of said columns, one of said electrodes extending through said body for receiving said first control signal, conductive material surrounding a major portion of said body form the outer end of one column to the outer end of the other column.

7. A system for providing a secondary frequency standard controlled by a radio signal, the combination comprising a radio receiver, a local oscillator, means for varying the frequency of said oscillator in response to a control signal, means for comparing the frequency of said radio signal with said oscillator frequency, said oscillator frequency being some multiple of an integer having any arbitrary value other than zero, including the value of one, and in response to said comparison, for producing a control signal proportionate to the difference between the frequency of said radio signal and said oscillator frequency divided by said integer, gating means connected to said comparing means for transmitting said control signal to said means for varying the frequency of said oscillator in response to a gating signal, means for detecting the reception of a radio signal having an amplitude above a predetermined level and in response to said detection for producing a gating signal, and means for transmitting said gating signal from said detecting means to said gating means, whereby said means for varying the frequency of said oscillator is disconnected from said comparing means when the radio signal received drops in amplitude below said predetermined level.

8. A system for providing a secondary frequency standard as defined by claim 7, wherein said means for comparing the frequency of said radio signal with said oscillator frequency comprises a first coherent detector in a phase-lock loop and said means for detecting the reception of a radio signal having an amplitude above a predetermined level comprises a second coherent detector so coupled to said receiver as to receive the radio signal 90° out of phase with the radio signal received by said first coherent detector, and a threshold level detector coupled to the output of said second coherent detector by a low-pass filter.

9. In a signal controlled oscillator including an active element and a resonant circuit having a nonmechanical electrically variable reactance element responsive to an input electrical signal, an improved reactance element comprising:

an elongated container formed of dielectric material;

a first quantity of liquid metal disposed within one portion of said container and operative to form a first capacitive electrode;

a second quantity of liquid metal disposed within another portion of said container and operative to form a second capacitive electrode;

an electrolyte disposed within said container between said first capacitive electrode and said second capacitive electrode;

a third capacitive electrode disposed exteriorly of said container and operative to cooperate with said first capacitive electrode to form a first capacitor, and with said second capacitive electrode to form a second capacitor; and means for causing said electrical signal to flow form said first capacitive electrode through said electrolyte to said second capacitive electrode, whereby the relative capacitances of said first and second capacitors are varied as the relative sizes of first and second capacitive electrodes are changed by electrolysis.

10. A signal controlled oscillator apparatus comprising:

a radio receiver responsive to a radio signal and operative to develop an electrical signal;

an oscillator circuit including an active element and a tuned circuit including a nonmechanical electrically variable reactance, said variable reactance being responsive to a control signal and operative to provide an oscillatory signal, the frequency of which is determined by said variable reactance, said variable reactance including, an elongated container formed of dielectric material, a first quantity of liquid metal disposed within a first potion of said container and operative to form a first capacitive electrode, a second quantity of liquid metal disposed within a second portion of said container and operative to form a second capacitive electrode, an electrolyte disposed within said container between said first capacitive electrode and said second capacitive electrode, a third capacitive electrode disposed exteriorly of said container and operative to cooperate with said first capacitive electrode to form a first capacitor, and with said second capacitive electrode to form a second capacitor, and means for coupling a control signal through said first capacitive electrode, said electrolyte, and said second capacitive electrode, whereby the relative capacitances of said first and second capacitors are varied as the relative sizes of said first and second plates are changed by electrolysis; and a signal comparator responsive to said electrical signal and said oscillatory signal and operative to develop said control signal.

11. A signal controlled oscillator apparatus as recited in claim 10 wherein said signal comparator includes a phase-locked coherent detector.